United States Patent
Busigin

(10) Patent No.: US 7,815,890 B2
(45) Date of Patent: Oct. 19, 2010

(54) PROCESS FOR TRITIUM REMOVAL FROM WATER BY TRANSFER OF TRITIUM FROM WATER TO AN ELEMENTAL HYDROGEN STREAM, FOLLOWED BY MEMBRANE DIFFUSION TRITIUM STRIPPING AND ENRICHMENT, AND FINAL TRITIUM ENRICHMENT BY THERMAL DIFFUSION

(75) Inventor: Anthony Busigin, Parkland, FL (US)

(73) Assignee: Special Separations Application, Inc., Brookville (CA)

( * ) Notice: Subject to any disclaimer, the term of this patent is extended or adjusted under 35 U.S.C. 154(b) by 1067 days.

(21) Appl. No.: 11/247,996

(22) Filed: Oct. 11, 2005

(65) Prior Publication Data

US 2010/0239481 A1    Sep. 23, 2010

(51) Int. Cl.
*C01B 4/00* (2006.01)
*C01B 3/24* (2006.01)

(52) U.S. Cl. .................................. 423/647.7; 423/650
(58) Field of Classification Search .............. 423/647.7
See application file for complete search history.

(56) References Cited

U.S. PATENT DOCUMENTS

| | | | | |
|---|---|---|---|---|
| 3,350,844 | A * | 11/1967 | Robb | 95/53 |
| 4,173,620 | A * | 11/1979 | Shimizu | 423/648.1 |
| 6,348,153 | B1 * | 2/2002 | Patterson et al. | 210/638 |
| 2004/0248735 | A1 * | 12/2004 | Li et al. | 502/313 |
| 2007/0246344 | A1 * | 10/2007 | Bonnett et al. | 203/5 |

FOREIGN PATENT DOCUMENTS

| | | | |
|---|---|---|---|
| JP | 63-205127 | * | 8/1988 |
| JP | 2-273516 | * | 11/1990 |
| WO | 99/34898 | * | 7/1999 |

* cited by examiner

Primary Examiner—Melvin C Mayes
Assistant Examiner—Kenneth Vaden
(74) Attorney, Agent, or Firm—Nixon Peabody LLP; Jeffrey L. Costellia

(57) ABSTRACT

A diffusion based process for tritium removal from water by tritium transfer from water to an elemental hydrogen stream, followed by a membrane diffusion cascade for tritium stripping and enrichment, and final tritium enrichment by one or more thermal diffusion columns. The combination of process steps takes advantage of membrane diffusion's large throughput capability at low tritium concentration with the simplicity of thermal diffusion for small throughput final tritium enrichment. The membrane diffusion stages use supported or unsupported microporous or hydrogen permeable metal membranes (such as Pd/Ag alloy). The diffusion process is compatible with any front-end process to transfer tritium from tritiated water to elemental hydrogen. The process may be designed and operated at low pressure, with small gas inventory, and no inherent overpressure hazard.

15 Claims, 1 Drawing Sheet

Process flow diagram illustrating the combined processes in the invention.

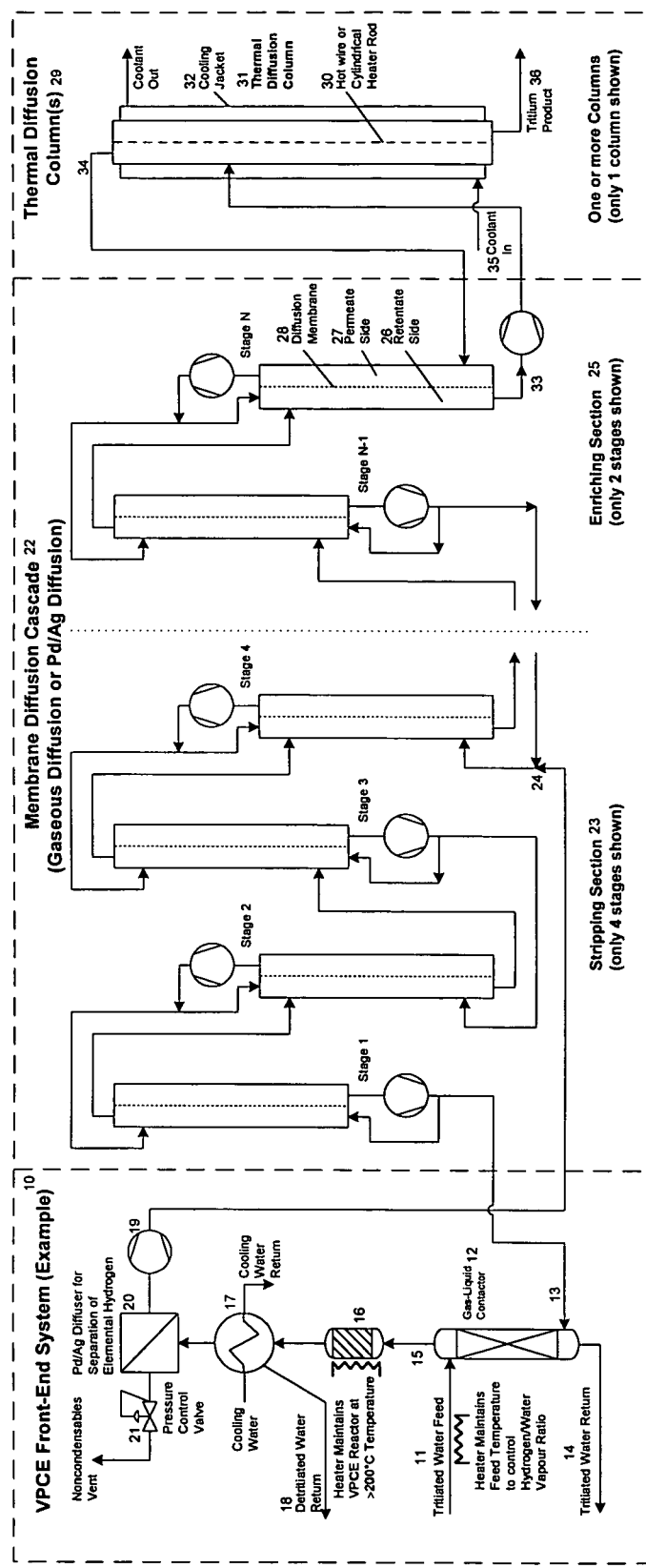
Figure 1. Process flow diagram illustrating the combined processes in the invention.

PROCESS FOR TRITIUM REMOVAL FROM WATER BY TRANSFER OF TRITIUM FROM WATER TO AN ELEMENTAL HYDROGEN STREAM, FOLLOWED BY MEMBRANE DIFFUSION TRITIUM STRIPPING AND ENRICHMENT, AND FINAL TRITIUM ENRICHMENT BY THERMAL DIFFUSION

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of tritium isotope recovery from water and more specifically to a process for tritium removal from water by transfer of tritium from water to an elemental hydrogen stream, followed by membrane diffusion tritium stripping and enrichment, and final tritium enrichment by thermal diffusion. Several large scale facilities have been built in Canada, France, and more recently South Korea, to extract tritium from heavy water moderator systems for nuclear reactors. Kalyanam and Sood, "Fusion Technology" 1988, pp 525-528, provide a comparison of the process characteristics of these types of systems. Similar although smaller light water tritium recovery systems have been designed for fusion applications (see H. Yoshida, et al, "Fusion Eng. and Design" 1998, pp 825-882; Busigin et al, "Fusion Technology", 1995 pp 1312-1316; A. Busigin and S. K. Sood, "Fusion Technology" 1995 pp 544-549). All current large scale systems employ a front-end process to transfer tritium from water to elemental hydrogen, followed by a cryogenic distillation cascade to perform all or most of the hydrogen isotope separation. Large scale membrane (gaseous) diffusion systems have been designed and built for uranium isotope separation. A thorough description of gaseous diffusion technology is provided by M. Benedict, T. Pigford and H. Levi, "Nuclear Chemical Engineering", McGraw Hill (1981). Gaseous diffusion has never been used for large scale hydrogen isotope separation.

Thermal diffusion columns have been used to separate hydrogen isotopes on a small scale since the 1950's as described by G. Vasaru et al, "The Thermal Diffusion Column", VEB Deutscher der Wissenschaften, Berlin, 1968. The use of this technology has been limited because it is not scaleable to large throughputs.

All current large scale processes for water detritiation are based on transfer of tritium from water to elemental hydrogen by: (a) a catalytic exchange reaction such as $DTO+D_2 \Longleftrightarrow D_2O+DT$; (b) direct electrolysis of water, i.e., $DTO \rightarrow DT+\frac{1}{2}O_2$; or (c) water decomposition by a suitable reaction such as the water gas shift reaction: $DTO+CO \rightarrow DT+CO_2$. (See Kalyanam and Sood "Fusion Technology" 1988, pp 525-528; A. Busigin and P. Gierszewski, "Fusion Engineering and Design" 1998 pp 909-914; D. K. Murdoch et al, "Fusion Science and Technology" 2005, pp 3-10; K. L. Sessions, "Fusion Science and Technology" 2005 pp 91-96; J. Cristescu et al, "Fusion Science and Technology" 2005, pp 97-101; I—R. Cristescu et al, "Fusion Science and Technology" 2005, pp 343-348.)

Recently a Pd/Ag membrane cascade has been proposed as an alternative technology to cryogenic distillation for application to ITER. (D. L. Luo et al, "Fusion Science and Technology" 2005, pp 156-158). However, the hydrogen throughput of the proposed device was a factor of 1000 times smaller that in a CANDU reactor moderator water detritiation systems such as the Darlington Tritium Removal Facility. This alternative is feasible for a small degree of isotope separation such as upgrade of plasma exhaust gases containing approximately 50% deuterium and 50% tritium, to a concentration of 90% tritium suitable for fusion fuel recycling. The high tritium throughput for a large fusion device makes use of a small throughput technology such as thermal diffusion impractical. In a typical water detritaition application for a nuclear reactor the tritium throughput is miniscule by comparison to an ITER scale fusion machine, however the quantity of water to be processed is very large.

The prior art large scale hydrogen isotope separation cryogenic distillation process has the following drawbacks:

1. handling of liquid cryogens with associated hazards, such as high pressure potential upon warmup and evaporation; thermal stresses due to very low temperature process conditions; requirement for a vacuum insulated coldbox vessel to contain the cryogenic equipment;
2. large liquid hydrogen (and tritium) inventory, mostly tied up in distillation column packing;
3. potential for blockage of process lines due to freezing of impurities;
4. complex and costly process plant;
5. complex operation and maintenance;
6. non-modular process making it difficult to upgrade and to keep equipment spares;
7. requires batch operated dryers and a liquid nitrogen adsorber to purify feed to the cryogenic distillation cascade.

Large scale membrane diffusion has not been used in the past for hydrogen isotope separation due to a combination of commercial unavailability and the fact that enriching tritium from a few parts per million to 99+% purity requires a large number of discrete compression stages. To be competitive with cryogenic distillation, the number of compression stages needs to be reduced, especially at the high tritium concentration end of the process where tritium materials compatibility and safety issues exist.

Thermal diffusion has been used successfully for small scale tritium separation, even up to 99+% tritium, but cannot be easily scaled for large throughput. This is because thermal diffusion columns must operate in the laminar flow regime, and scale-up would push column operation into the turbulent flow regime (R. Clark Jones and W. H. Furry, "Reviews of Modern Physics", 1946, pp 151-224). The alternative of constructing many small thermal diffusion columns in parallel is unattractive when the throughput requirement is large. Thermal diffusion columns also have low thermodynamic efficiency, which while unimportant at small scale becomes problematic at large scale.

BRIEF SUMMARY OF THE INVENTION

The primary object of the invention is to provide a large-scale non-cryogenic diffusion based process for detritiation of light and heavy water that is simpler and more economical than a conventional cryogenic distillation process.

Another object of the invention is to provide a process that is simpler to start-up, shutdown and operate than a conventional cryogenic distillation process.

Another object of the invention is to provide a modular process that can be designed and upgraded more simply than a conventional cryogenic distillation process.

A further object of the invention is to provide a process based on standardised modules that simplifies maintenance and keeping of equipment spares.

Yet another object of the invention is to provide a process with significantly smaller elemental hydrogen isotope inventory than a conventional cryogenic distillation process.

Still yet another object of the invention is to provide a process with reduced hazards due to elimination of liquid cryogens in comparison to a conventional cryogenic distillation process.

Another object of the invention is to provide a process capable of detritiating water containing parts per million tritium and producing a product with a tritium concentration of 99% or higher.

Another object of the invention is to provide a continuous process with no requirement for batch operations such as a dryer and liquid nitrogen adsorber typically used at the front end of a cryogenic distillation system.

Other objects and advantages of the present invention will become apparent from the following descriptions, taken in connection with the accompanying drawing, wherein, by way of illustration and example, an embodiment of the present invention is disclosed.

In accordance with a preferred embodiment of the invention, there is disclosed a process for tritium removal from water by transfer of tritium from water to an elemental hydrogen stream, followed by membrane diffusion tritium stripping and enrichment, and final tritium enrichment by thermal diffusion. The process combines a membrane diffusion cascade for tritium stripping and preliminary enrichment with one or more thermal diffusion columns for final tritium enrichment. This combination takes advantage of scalability of membrane diffusion at large throughputs and low tritium concentrations with the simplicity of thermal diffusion for the small throughput required for final enrichment, The process is compatible with any front-end process to transfer tritium from tritiated water to elemental hydrogen including Vapor Phase Catalytic Exchange (VPCE), Liquid Phase Catalytic Exchange (LPCE), Direct Electrolysis (DE), Combined Electrolysis and Catalytic Exchange (CECE), water decomposition by water gas shift reactor (i.e. Palladium Membrane Reactor (PMR)) or a Hot Metal Bed Reactor (HMBR). The process may be designed to, but not limited to, operate at low pressure (approximately 1 atmosphere) in the high pressure side of the membrane diffusion section, and in the thermal diffusion section. There is no overpressure hazard such as with conventional cryogenic distillation where liquid cryogens evaporate upon warmup.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 1 is a process flow diagram illustrating the combined processes in the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

In accordance with the present invention, FIG. 1 shows a conceptual process flow diagram for a water detritiation system based on the invention. The Front-End System 10 shown is a Vapor Phase Catalytic Exchange (VPCE) system where tritiated water feed 11 flows into gas-liquid contactor 12 which is used to humidify detritiated gas stream 13. Unevaporated water 14 leaving the gas-liquid contactor 12 may be recycled back to feed stream 11 or returned to source, depending on the application.

In this example, the temperature of the feed 11 to the gas-liquid contactor 12 is controlled to maintain an optimum hydrogen-water vapor ratio in the humidified gas top exit stream 15, which then passes through a high temperature catalytic reactor 16 wherein tritium rich water reacts according to the exchange reaction $$DTO+D_2 \leftrightarrows D_2O+DT.$$

However, it is should be understood that the process is useful in the extraction of tritium from tritium-rich heavy or light water according to any of the following reactions:

$$DTO+D_2 \leftrightarrows D_2O+DT$$

$$HTO+H_2 \leftrightarrows H_2O+HT$$

$$HTO+HD \leftrightarrows HDO+HT$$

or more generally $$QTO+Q_2 \leftrightarrows Q_2O+QT$$

where Q denotes either of the hydrogen isotopes H and D. In all these reactions, tritium transfer occurs from water to elemental hydrogen.

A significant depletion of the tritium concentration in the detritiated water return stream 18 requires a high hydrogen to water vapor ratio in the feed stream 15 to the catalytic reactor. However, in an application such as heavy water reactor moderator water detritiation, where the primary objective may be to maximize the overall tritium removal rate, a low hydrogen to water vapor ratio may be preferable to maximize the overall tritium removal rate.

The Front-End System 10 shown in FIG. 1 could be replaced by a different system such as Liquid Phase Catalytic Exchange (LPCE), Direct Electrolysis (DE), Combined Electrolysis and Catalytic Exchange (CECE), water decomposition by water gas shift reaction such as a Palladium Membrane Reactor (PMR), or in a Hot Metal Bed Reactor (HMBR). Similarly, the gas-liquid contactor 12 may be another device such as a humification membrane, evaporator, etc.

Downstream of the reactor 16, water vapor is condensed in condenser 17, and then returned by gravity as detritiated water 18. Downstream of the condenser, elemental hydrogen isotopes are drawn via feed vacuum pump 19 as permeate through a Pd/Ag membrane 20 which is permeable only to elemental hydrogen isotopes. Pd/Ag membrane 20 and feed vacuum pump 19 may be one or more units operating in combination to achieve high recovery efficiency of hydrogen isotopes. Non permeable gases or vapors are vented as retentate through pressure control valve 21, which is heat traced to sufficient temperature to prevent condensation therein of water vapor.

The outlet of feed vacuum pump 19 is fed into the Membrane Diffusion Cascade 22. The feed position 24 in the Membrane Diffusion Cascade is shown at Stage 4. The feed position is application specific, depending on the stripping requirement, so feed position 24 at Stage 4 should be considered as an example only. Each stage of the Membrane Diffusion Cascade 22 is comprised of at least one compressor and one membrane. For large throughput, each stage may have several membranes and compressors connected in parallel, since compressors are available only in discrete sizes. The Stripping Section 23 strips tritium to produce a detritiated gas product stream 13 for recycle to the Front-End system 10. The Enriching Section 25 enriches tritium to sufficient concentration to allow final enrichment to be carried out by one or more (but a practical number) of Thermal Diffusion Column(s) 29. The tritium enriched product 33 from the Membrane Diffusion Cascade 22 is fed into the Thermal Diffusion Column(s) 29 for final enriching.

Each membrane unit in the Membrane Diffusion Cascade 22 has a high pressure retentate side 26, a low pressure permeate side 27, and a diffusion membrane 28. The diffusion membrane 28 is either a microporous membrane in which the pores are typically smaller that the gas mean free path, or a metal membrane such as a Pd/Ag hydrogen permeable membrane. In either case, the lighter isotopic species diffuse through the membrane more quickly than the heavier species, with the result that the heavier isotopes are concentrated on the retentate side of the membrane. The number of stripping and enriching stages employed in a system is determined by the system separation requirement, and the number of stages required to reduce the flow 33 to the downstream Thermal Diffusion Column(s) 29 to a practical value.

The Membrane Diffusion Cascade 22 may be designed to operate at low pressure. For a microporous membrane, the operating pressure may not be increased beyond the point where the gas mean free path is substantially greater than the pore size.

Due to the presence of limited gas inventory, there is no high pressure hazard inherent in the system design. This is in sharp contrast to cryogenic distillation which has a potential for overpressure upon warmup when liquid cryogens evaporate and expand. Furthermore, the Membrane Diffusion Cascade 22 has small inventory since it avoids handling liquid hydrogen. (Liquid hydrogen has approximately three orders of magnitude higher molar density than low pressure warm gas.)

One Thermal Diffusion Column 31 is shown in FIG. 1, although several columns in parallel or series may be practical, depending on the application. The thermal diffusion column is comprised of a hot-wire or cylindrical heating rod 30 located concentrically inside a tube surrounded by a cooling jacket 32. Tritium product 36 is withdrawn from the bottom of the column 31, and tritium depleted gas 34 is returned to the Membrane Diffusion Cascade 22. The coolant 35 is typically water, but can in principle be a colder substance such as liquid nitrogen. The separation performance of a thermal diffusion column improves as the ratio of hot to cold temperature is increased.

By combining the scalability of the Membrane Diffusion Cascade 22 to large throughputs with one or more small throughput Thermal Diffusion Columns 29, the combined process has a practical number of stages in the Membrane Diffusion Cascade 22 and a practical number of Thermal Diffusion Columns 29. Either process option on its own is either unattractive or impractical.

The combined Membrane Diffusion Cascade 22 and Thermal Diffusion Columns 29 are much simpler to operate than a conventional cryogenic distillation cascade. There are no complex startup, operation, or shutdown sequences. The process is continuous with no requirement for batch operations.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A large-scale process for tritium removal from water, with no tritium enrichment in the water form, comprising the steps of, in series,
   transferring tritium from water to an elemental hydrogen stream,
   membrane diffusion tritium stripping and tritium enrichment using a counter-current flow membrane diffusion cascade configuration, to a level of tritium concentration sufficient to allow for a final tritium enrichment step, and
   a final tritium enrichment occurring by thermal diffusion.

2. The process of claim 1, wherein the process is a non-cryogenic diffusion-based process.

3. The process of claim 1, wherein the process detritiates water containing parts per million tritium to produce a product with a tritium concentration of 99% or higher.

4. The process of claim 1, wherein the process is a continuous process.

5. The process of claim 4, wherein the process is performed in the absence of a liquid nitrogen adsorber.

6. The process of claim 1, wherein the process operates at low pressures.

7. The process of claim 6, wherein the process operates at a pressure of about 1 atmosphere or less.

8. The process of claim 1, wherein the membrane diffusion step utilizes a supported microporous membrane, an unsupported microporous membrane, a supported hydrogen permeable metal membrane, an unsupported hydrogen permeable metal membrane, or a combination thereof.

9. The process of claim 7, wherein membrane diffusion step utilizes at least one supported microporous membrane.

10. The process of claim 7, wherein membrane diffusion step utilizes at least one unsupported microporous membrane.

11. The process of claim 7, wherein membrane diffusion step utilizes at least one supported hydrogen permeable membrane.

12. The process of claim 7, wherein membrane diffusion step utilizes at least one unsupported hydrogen permeable membrane.

13. The process of claim 7, wherein the membrane is a Pd/Ag alloy.

14. The process of claim 1, wherein the process is compatible with any front-end process to transfer tritium from tritiated water to elemental hydrogen.

15. The process of claim 14, wherein the front-end process is selected from the group consisting of Vapor Phase Catalytic Exchange (VPCE), Liquid Phase Catalytic Exchange (LPCE), Direct Electrolysis (DE), Combined Electrolysis and Catalytic Exchange (CECE), water decomposition by water gas shift reactor, Hot Metal Bed Reactor (HMBR), and combinations thereof.

* * * * *